Aug. 15, 1961   M. W. BAUMAN   2,996,228
TOWING HARNESS
Filed Sept. 26, 1958
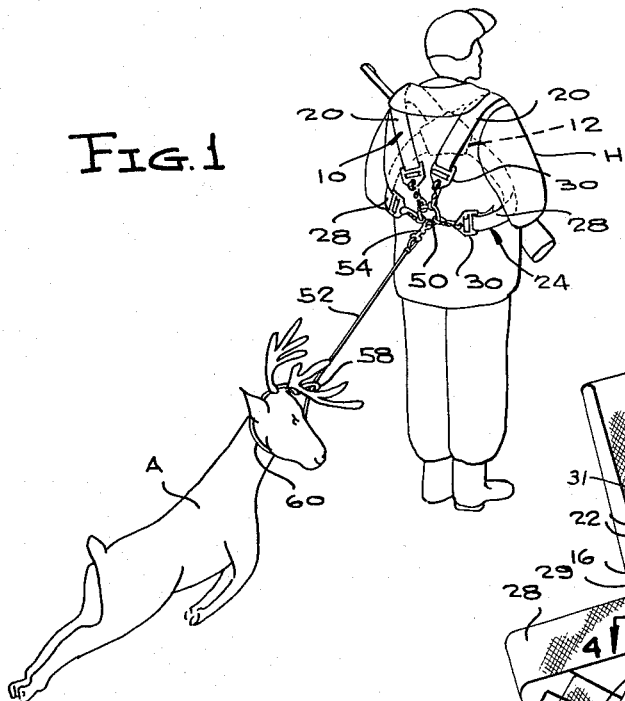
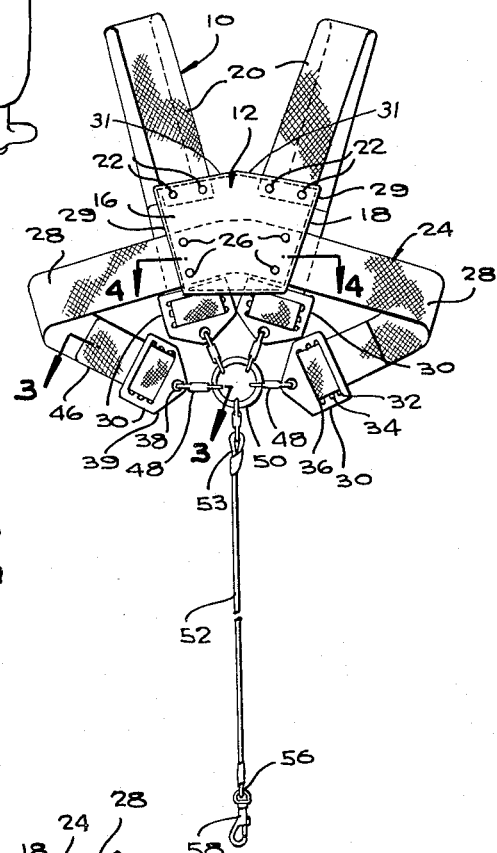
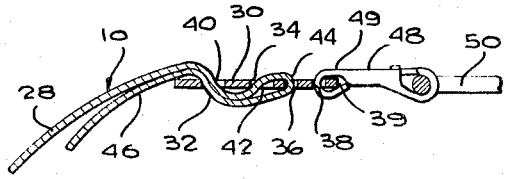
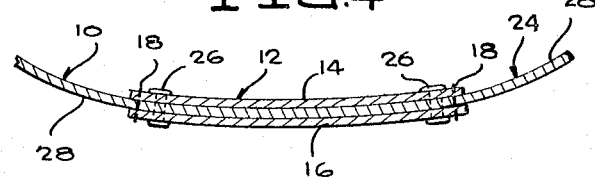
INVENTOR.
MALCOLM W. BAUMAN
BY
McMorrow, Berman & Davidson
ATTORNEYS United States Patent Office 2,996,228
Patented Aug. 15, 1961

2,996,228
TOWING HARNESS
Malcolm W. Bauman, S. Pine St., Castanea, Pa.
Filed Sept. 26, 1958, Ser. No. 763,636
1 Claim. (Cl. 224—5)

This invention relates to harnesses generally, and more particularly has reference to a harness which is adapted to be used by an individual in towing any of various objects.

The invention has particular adaptability as a harness for towing large game, such as deer, but as will presently appear, the harness has general utility as a towing device, and might be employed advantageously, for example, as a means whereby one may pull a sled, wagon, or like vehicle.

Hereinafter, the invention will be described with specific reference to its adaptability as a means facilitating the towing of game, but as noted above, this is not to be considered as unduly restrictive of the scope of the invention.

In the towing of game, considerable difficulty is presented, ordinarily, in that in many instances the animal will be quite heavy. This would be true, for example, when one has killed a deer, and must haul the same out of the woods. Many hunters hunt individually, or, in any event, are a substantial distance away from companions at the time the game is killed and must be hauled out. Ordinarily, it is the practice to tie a rope or equivalent means about the animal's head, after which one attempts to haul the animal out of the woods as best he can. This places undesirable strain upon one's muscles, due to the continual twisting of the body when the animal is being pulled out in this conventional way.

Still further, this arrangement has the disadvantage that it does not free both of one's hands. This is undesirable inasmuch as one may need both hands free to carry his rifle, assist himself through heavy underbrush, etc.

It has been heretofore proposed to provide a harness to obviate the difficulties noted above, and the present invention is not intended to constitute, in its essential characteristics, the broad, over-all concept of using a harness adapted for hauling game out of the woods. Rather, the invention is intended to be a more particular, novel improvement in this general category of devices.

One object of the invention, accordingly, is to provide a harness of the character described that will be of a generally improved nature as compared to harnesses previously devised for the same purpose.

Another object is to provide a harness as stated which will be characterized by the simplicity of its construction.

A further object is to provide a harness as described which will be applicable to one's body with maximum speed and ease, and which will be removable from the body with equal facility.

A further object is to provide a harness as stated which will not interfere with use of the hands, thus leaving both hands free for carrying objects, assisting oneself over rugged terrain, etc.

Another object of importance is to provide a harness which will be comfortable when worn, while yet being specially designed to permit a heavy pulling force to be exerted.

Another object is to so design the harness that although a heavy pulling force is exerted, the exertion expended by the user will be kept to a minimum.

Another object is to provide a novel arrangement of straps or equivalent flexible elements, so designed as to cause all the exertion to be transmitted to and concentrated in the particular point to which the animal-attached pulling cable or strap is connected.

A further object is to so form the harness as to facilitate the making of adjustments in the various component parts thereof, whereby to swiftly fit the harness to the particular user.

Other objects will appear from the following description, the claim appended thereto, and from the annexed drawing, in which like reference characters designate like parts throughout the several views, and wherein:

FIGURE 1 is a perspective view of the harness as seen from the rear when in use;

FIGURE 2 is an enlarged front elevational view thereof;

FIGURE 3 is a still further enlarged, detail sectional view substantially on line 3—3 of FIGURE 2; and FIGURE 4 is a detail sectional view, on a scale substantially equal to that of FIGURE 3, taken on line 4—4 of FIGURE 2.

Referring to the drawing in detail, the harness comprising the present invention has been generally designated 10 and is shown in FIGURE 1 in use on the body of a hunter "H," for the purpose of hauling a game animal "A."

The harness 10 includes a breast pad 12, which is roughly trapezoidal in configuration, said breast pad being made of stout leather, plastic, or any other suitable material, it being understood that the use of particular materials is not critical to the present invention.

The breast pad 12, in the illustrated, preferred embodiment, comprises a pair of like back and front pieces 14, 16 respectively (see FIGURE 4), having their peripheries in registration, said pieces being stitched together throughout their peripheries by a line of stitching 18.

The device further includes a pair of shoulder straps 20. Shoulder straps 20 in the illustrated example are formed from elongated, wide lengths of webbing. Again, other materials may be employed as long as they have the requisite characteristics of strength, flexibility, and resistance to deterioration when exposed to the elements.

The shoulder straps 20 diverge upwardly from the top edge of the pad, with the forward ends of the shoulder straps being inserted between the top edge portions of the back and front pieces 14, 16 respectively. Said front ends of the shoulder straps are fixedly secured to the back and front pieces, as for example, by rivets 22.

The stitching 18, as will be noted, passes across the straps, adjacent the riveted connections, further strengthening the connection of the straps to the breast pad.

Shoulder straps 20, in use, extend over the shoulders of the wearer's body, as shown in FIGURE 1, and then extend downwardly in converging relation, toward the small of the wearer's back, said shoulder straps terminating, however, a substantial distance above the small of the back, as will be clearly seen from FIGURE 1.

The breast pad, meanwhile, preferably is disposed rather high upon the chest, in a centered position, as shown in FIGURE 1.

An elongated, wide band generally designated 24 extends transversely of the breast pad adjacent the lower edge thereof. Band 24 has its mid-length portion extended between the pieces 14, 16, said mid-length portion being bowed upwardly to a slight degree in a preferred arrangement. This defines, when the mid-length portion of band 24 is secured by rivets 26 to the breast pad, laterally outwardly projecting, elongated side straps 28 of equal length. The side straps are inclined downwardly outwardly from the opposite sides of the breast pad, in perpendicular relation to the downwardly convergent side edges 29 of the breast pad.

The side edges 29, by reason of their downwardly convergent relation, are at an angle to each other, with the respective side straps 28 extending outwardly from the respective side edges perpendicularly thereto. This provides, necessarily, for the above-mentioned inclination of the side straps downwardly outwardly from the respective, opposite sides of the breast pad.

The top edge of the breast pad, as shown in FIGURE 2, includes angularly related edge portions 31. These are at a wide obtuse angle to each other, and extending perpendicularly to the respective edge portions 31 are the shoulder straps 20.

By reason of this arrangement, the shoulder straps 20 diverge upwardly from the breast pad. It is also a characteristic of the invention that the arrangement results in a perpendicular disposition of the length of the side and shoulder straps to the portions of the stitching 18 extending thereacross. In this way, a particularly strong connection is provided between each strap and the breast pad, whereby the stitching and the rivets both function in absorbing the pulling force exerted on the several straps during the normal usage of the device. A coaction of the stitching and rivets thus results, in the sense that both constitute positive connections of the straps to the breast pad, designed to bring about a particularly strong connection of the straps to the pad. The final result is that although the pad is quite small, it serves as a particularly effective connector means at the front of the device, from which the several straps diverge. The small size of the breast pad of course leaves a maximum amount of the hunter's garment exposed at the front, thereby to permit ready access to the several pockets that the hunter would ordinarily have in his clothing.

Apart from the above, an even stronger connection results from the fact that the side straps 28 are portions of a single band, as previously discussed herein. Due to the arrangement illustrated, any pull on the side straps is taken up, in the final analysis, by the mid-length portion of the band, and is not required to be assumed by the breast pad.

Connected to the rear ends of the shoulder and side straps are identical, flat connector plates 30. The connector plates 30 are all alike, so that the description of one will suffice for all. As will be seen from FIGURE 3, each connector plate is formed with a plurality of slots 32, 34, 36, and also formed in each plate 30 is a relatively small circular opening 38 formed in a bluntly pointed forward end 39 of the plate.

Each strap, whether it be a side strap or a shoulder strap, is first extended, as at 40, through slot 32, then extended reversely at 42 through the slot 34, and then looped rearwardly through slot 36, as shown at 44. Thereafter, the material of the strap is extended in a reverse direction through slot 32, leaving a free end portion 46 of the strap.

When a pulling force is exerted on the strap, as would of course be true in normal use of the device, the strap is tightened in the slots, following threading of the strap through said slots to attach the same to the connector plate.

Of course, the length of the strap can be adjusted, merely by disposition of a selected portion thereof through the slots.

Designated at 48 are snap clasps, having loops 49 at one end extending through the apertures 38 of the respective connector plates. The clasps 48 project forwardly from the respective connector plates, and at their forward ends are detachably connected to a ring 50.

Ring 50 is centrally disposed in the lower area of the user's back, as shown in FIGURE 1, with all the straps being connected thereto, as clearly seen in FIGURES 1 and 2.

Designated at 52 is a flexible element, having at one end a loop 53 connecting the same to a snap clasp 54 detachably connected to the ring. At its other end, element 52 has a loop 56 connected to a clasp 58, the free end of which is adapted to receive the body portion of the element 52 after extension about the head of the animal, thus forming a loop 60 receiving the animal's head.

It will be apparent that when in use, the device is efficiently adapted for hauling the animal, and the pulling pressure is distributed over a substantial area of the shoulders, chest, and sides of the user. The pulling force is transmitted to the ring, so as to be concentrated at the head end of the element 52. The result is that a great weight can be hauled through even heavy underbrush, with minimum discomfort and fatigue so far as the user is concerned.

Another desirable characteristic of the invention resides in the ease with which the same may be applied to or removed from the body. The shoulders are readily freed of the straps 20, merely by slipping said straps off the shoulders. In these circumstances, the upward pull that would normally be exerted upon the breast pad by the shoulder straps is immediately eliminated. The breast pad then tends to sag downwardly to a slight degree. By reason of the fact that the side straps diverge downwardly outwardly from the opposite sides of the breast pad, the downward movement of the breast pad creates a certain amount of slack in the side straps, so that the side straps can be slipped downwardly off the user's body.

This is mentioned merely as one way in which the harness could be removed. Of course, one may readily reach about his body to engage selected ones of the clasps 48 for detaching the same from the ring 50.

In any event, the device is also possessed of a desirable characteristic wherein it frees both hands of the user for carrying articles, such as a rifle or other hunting equipment.

Still further, the device is adapted to be manufactured at comparatively low cost, while yet being capable of a high degree of resistance to wear, the device having the further characteristic of being foldable into a relatively compact article easily stored in a small space in one's hunting gear.

It is believed apparent that the invention is not necessarily confined to the specfic use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claim.

What is claimed is:

A towing harness consisting of a body band having end portions and a middle portion, a breast pad secured to said middle portion and upstanding therefrom, a pair of shoulder straps having forward ends secured to the pad, said shoulder straps and said band end portions having free rear ends, a single tow line ring, and separable fasteners on the free ends of the shoulder straps and body band end portions severally engaged on said ring, and plates secured on the straps at and extending beyond the free ends of the straps, said plates having free end portions to which the fasteners are pivoted, and means adjustably securing the straps to the plates comprising spaced slots through which portions of the straps are alternately trained.

References Cited in the file of this patent

UNITED STATES PATENTS

| | | |
|---|---|---|
| 397,002 | Issacs | Jan. 29, 1899 |
| 995,458 | Harriman | June 20, 1911 |
| 1,642,911 | Thurnau | Sept. 20, 1927 |
| 1,651,561 | Storey | Dec. 6, 1927 |
| 2,372,558 | Dowd | Mar. 27, 1945 |
| 2,449,741 | Fitzpatrick | Sept. 21, 1948 |
| 2,592,771 | Wampler | Apr. 15, 1952 |
| 2,715,989 | Sjodin et al. | Aug. 23, 1955 |
| 2,833,555 | Zotkewicz | May 6, 1958 |